US012409663B2

(12) United States Patent
Yraceburu et al.

(10) Patent No.: US 12,409,663 B2
(45) Date of Patent: Sep. 9, 2025

(54) COMPOSITE ELECTRODE FLUID LEVEL SENSING

(71) Applicant: HEWLETT-PACKARD DEVELOPMENT COMPANY, L.P., Spring, TX (US)

(72) Inventors: Robert Yraceburu, Vancouver, WA (US); Elliott Michael Downing, Vancouver, WA (US); Jody Lee Clayburn, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 445 days.

(21) Appl. No.: 17/792,260

(22) PCT Filed: Jan. 28, 2020

(86) PCT No.: PCT/US2020/015471

§ 371 (c)(1),
(2) Date: Jul. 12, 2022

(87) PCT Pub. No.: WO2021/154217

PCT Pub. Date: Aug. 5, 2021

(65) Prior Publication Data

US 2023/0052524 A1 Feb. 16, 2023

(51) Int. Cl.
*G01F 23/24* (2006.01)
*B41J 2/175* (2006.01)

(52) U.S. Cl.
CPC .. *B41J 2/17566* (2013.01); *B41J 2002/17579* (2013.01)

(58) Field of Classification Search
CPC ......... G01F 23/0007; G01F 23/24–244; G01F 23/26–268
See application file for complete search history.

(56) References Cited

U.S. PATENT DOCUMENTS 5,408,223 A * 4/1995 Guillemot ............. G01F 23/241 73/304 R
6,431,670 B1 8/2002 Schantz et al.
(Continued)

FOREIGN PATENT DOCUMENTS

CN 208148820 C1 11/2018
EP 2657663 A1 * 10/2013 ........... G01F 23/265
WO WO-2017131761 A1 8/2017

OTHER PUBLICATIONS

Anne Marie Helmenstine, Ph. D. (May 12, 2024). A table of electrical conductivity and resistivity of common materials. ThoughtCo. https://www.thoughtco.com/table-of-electrical-resistivity-conductivity-608499 (Year: 2024).*

*Primary Examiner* — Alexander A Mercado
(74) *Attorney, Agent, or Firm* — Brooks, Cameron & Huebsch

(57) ABSTRACT

A fluid level sensing system includes: a sensor electrode to extend into a fluid reservoir, the sensor electrode including (i) a first segment of a first material having a first conductivity, and (ii) a second segment of a second material having a second conductivity; and a controller connected to the sensor electrode, to: detect a response from the sensor electrode to an input applied to the fluid reservoir; and determine, based on the response, which of the first and second segments are in contact with fluid in the fluid reservoir.

14 Claims, 7 Drawing Sheets

(56) References Cited

U.S. PATENT DOCUMENTS

| | | | | |
|---|---|---|---|---|
| 6,874,861 | B2 | 4/2005 | Farr et al. | |
| 7,775,105 | B2 | 8/2010 | Khadkikar et al. | |
| 7,802,471 | B2 | 9/2010 | Sieh et al. | |
| 9,789,697 | B1 | 10/2017 | Knierim et al. | |
| 10,323,972 | B1 * | 6/2019 | van Dijk | G01F 23/242 |
| 2005/0280424 | A1 * | 12/2005 | Qu | G01F 23/265<br>324/663 |
| 2007/0076023 | A1 | 4/2007 | Knierim et al. | |
| 2007/0240506 | A1 * | 10/2007 | Lin | G01F 23/266<br>73/304 R |
| 2009/0019930 | A1 * | 1/2009 | Larocque | G01F 23/265<br>702/155 |
| 2012/0184932 | A1 * | 7/2012 | Giezendanner | G01F 23/268<br>73/304 R |
| 2012/0306974 | A1 | 12/2012 | Nicholson et al. | |
| 2013/0276533 | A1 * | 10/2013 | Wilder | G01F 23/263<br>73/304 C |
| 2016/0202103 | A1 * | 7/2016 | Heinonen | G01F 23/242<br>73/304 C |
| 2018/0080808 | A1 * | 3/2018 | Naydenov | G01F 23/265 |
| 2020/0064176 | A1 * | 2/2020 | Souques | G01F 23/265 |
| 2021/0088499 | A1 * | 3/2021 | Stewart | G01N 11/14 |

* cited by examiner

COMPOSITE ELECTRODE FLUID LEVEL SENSING

BACKGROUND

Fluid dispensing devices, such as ink cartridges for printers, may include reservoirs holding fluid (e.g. ink) to be dispensed. The devices may also include mechanisms to determine a volume of fluid contained in the reservoir. Such mechanisms may be subject to constraints on available space, manufacturing cost, or the like.

BRIEF DESCRIPTIONS OF THE DRAWINGS

DETAILED DESCRIPTION

To provide level sensing for a fluid reservoir of a fluid dispensing device, a conductive sensor electrode may be provided within the reservoir. For example, the reservoir may hold printing fluid for application by a printing system. The sensor electrode may extend to a predetermined level within the reservoir, such that when the fluid is below the predetermined level the sensor electrode is not in contact with the fluid, and when the fluid is at or above the predetermined level, the sensor electrode is in contact with the fluid. A drive electrode may also be provided within the reservoir, to apply a drive signal to the fluid. When the sensor electrode is in contact with the fluid, the drive signal is detected by the sensor electrode, and a controller connected with the sensor electrode can determine that the fluid is at least at the predetermined level mentioned above.

The arrangement mentioned above thus provides a binary indication of whether the fluid in the reservoir is above or below the predetermined level to which the sensor electrode extends. To provide indications of whether the fluid is above or below additional levels, additional sensor electrodes may be installed in the reservoir. Such additional sensor electrodes, however, may increase the manufacturing cost of the fluid dispensing device. In addition, additional sensor electrodes may be difficult to accommodate physically within the reservoir.

To provide multi-level sensing for fluid dispensing devices, while reducing manufacturing costs and the physical footprint of the sensing mechanism, described herein is a fluid level sensing system includes a composite sensor electrode, including segments with different conductivities.

Figure 1:
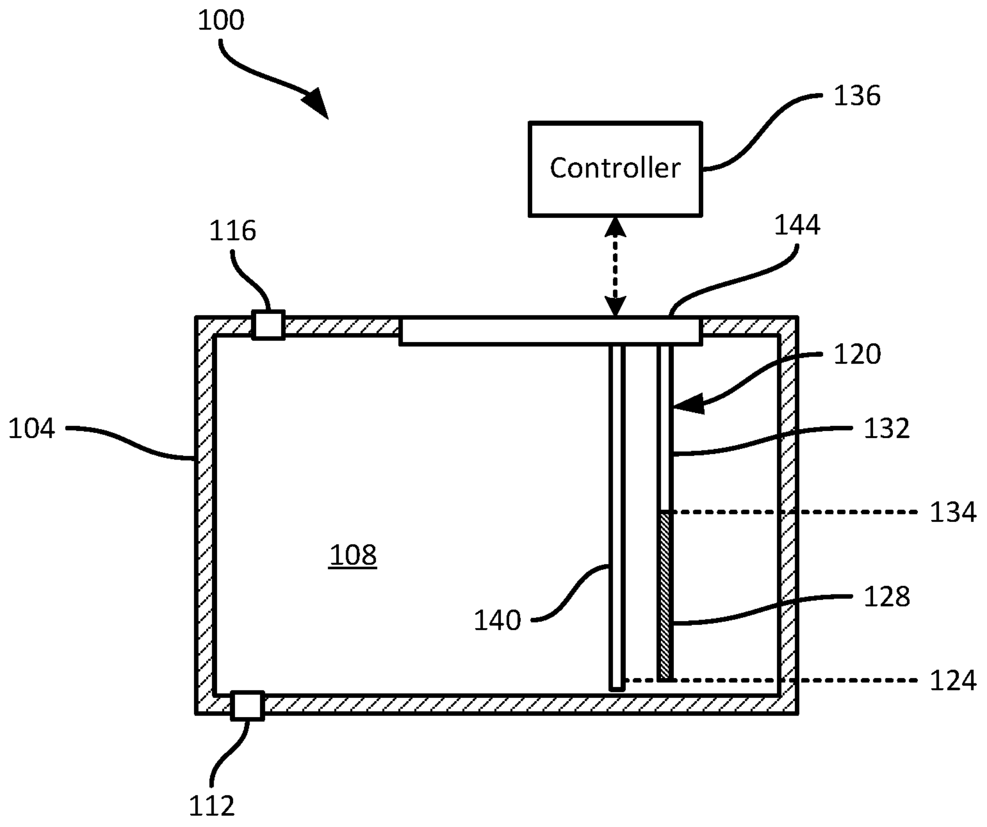
FIG. 1 is a diagram of an example fluid dispenser with a level sensing system.

FIG. 1 shows a cross sectional view of a fluid dispenser 100. The fluid dispenser 100 includes a housing 104 that defines a fluid reservoir 108 therein. The fluid reservoir 108 is to contain a fluid, such as printer ink, liquid printer toner, feed fluid for a 3D printer, or the like. The fluid dispenser 100 can be a printer cartridge that stores ink or toner and dispenses the ink or toner to a print head for application to print media. The fluid dispenser 100 may also be used by a 3D printer to apply the above-mentioned feed fluid to a bed of material such as a substrate plate. The fluid dispenser 100 therefore also includes at least one outlet 112, to dispense fluid e.g. towards the print head, and at least one inlet 116 to receive fluid to replenish the reservoir 108. In some examples, multiple outlets 112 may be provided. In some examples, multiple inlets 116 may also be provided.

The fluid dispenser 100 also includes a sensing system to provide multi-level sensing within the reservoir 108. That is, the sensing system can determine, for each of at least two levels within the reservoir, whether the fluid is at or above the respective level. The sensing system includes a sensor electrode 120 that extends into the reservoir 108 to terminate at a first fluid level 124. The sensor electrode 120 includes at least a first segment 128 and a second segment 132. As seen in FIG. 1, the first segment 128 terminates at the level 124, while the second segment terminates at a level 134.

The first segment 128 includes a first material with a first conductivity, and the second segment 132 includes a second material with a second conductivity. That is, the first and second segments 128 and 132 have different conductivities as a result of the different materials used in the first and second segments 128 and 132. The first material and the second material can include metals with different conductivities. The first material and the second material can also include conductive powders, fibers or the like embedded in a carrier material such as a plastic, a thermoset epoxy, silicon, or the like. Examples of such powders and fibers include metal powders and carbon fiber. For example, the first material can include a greater concentration of the above-mentioned conductive components in the carrier material than the second material.

The fluid dispenser 100 also includes a controller 136 connected with the sensor electrode 120. The controller 136 can be implemented as at least one microcontroller, sensing circuit, field-programmable gate array (FPGA), or the like. The fluid dispenser 100 further includes a drive electrode 140 that extends into the reservoir 108 and terminates at least at the level 124, or below the level 124. As illustrated in FIG. 1 the sensor electrode 120 and the drive electrode 140 extend into the reservoir from an upper wall of the housing 104. In other examples, the sensor electrode 120 and the drive electrode 140 can extend into the reservoir from a side wall or a lower wall of the housing 104.

The drive electrode 140, as well as the sensor electrode 120, are connected with the controller 136. For example, the sensor electrode 120 and the drive electrode 140 can be supported by a sensor mount 144 containing electrical connections between the controller 136 and the electrodes 120 and 140. The segment 128 is distal to the sensor mount 144, while the segment 128 is proximal to the sensor mount 144.

The controller 136 applies an input, also referred to as a drive signal, to the fluid in the reservoir 108 via the drive electrode 140. If the sensor electrode 120 is in contact with the fluid, the drive signal is received by the sensor electrode 120 and detected by the controller 136. Because of the differing conductivities of the segments 128 and 132, the response detected by the controller 136 via the sensor electrode 120 varies depending on whether the segment 128 alone is in contact with the fluid, or whether the segments 128 and 132 are both in contact with the fluid. The controller 136 can determine, based on step-like variations in the response from the sensor electrode 120, which of the segments 128 and 132 are in contact with the fluid.

In particular, when the fluid in the reservoir 108 rises from below the level 134 to above the level 134, the change in conductivity caused by the segment 132 coming into contact with the fluid leads to a step-like change in the response detected at the controller 136. The first segment 128 can have a lower conductivity than the second segment 132, and the step-like change can therefore be an increase in the magnitude of the response, the frequency of the response, or the like. The controller 136 can store, for each segment of the sensor electrode 120, a range of response values corresponding to that segment. Thus, when the response detected at the controller falls within the range that corresponds to the segment 132, the controller 136 can determine that the segment 132 and the segment 128 are in contact with the fluid. In other words, the controller 136 can determine whether the fluid is below the level 124 (when the drive signal is not detected by the sensor electrode 120), whether the fluid is between the level 124 and the level 134, or whether the fluid is above the level 134.

Figure 2:
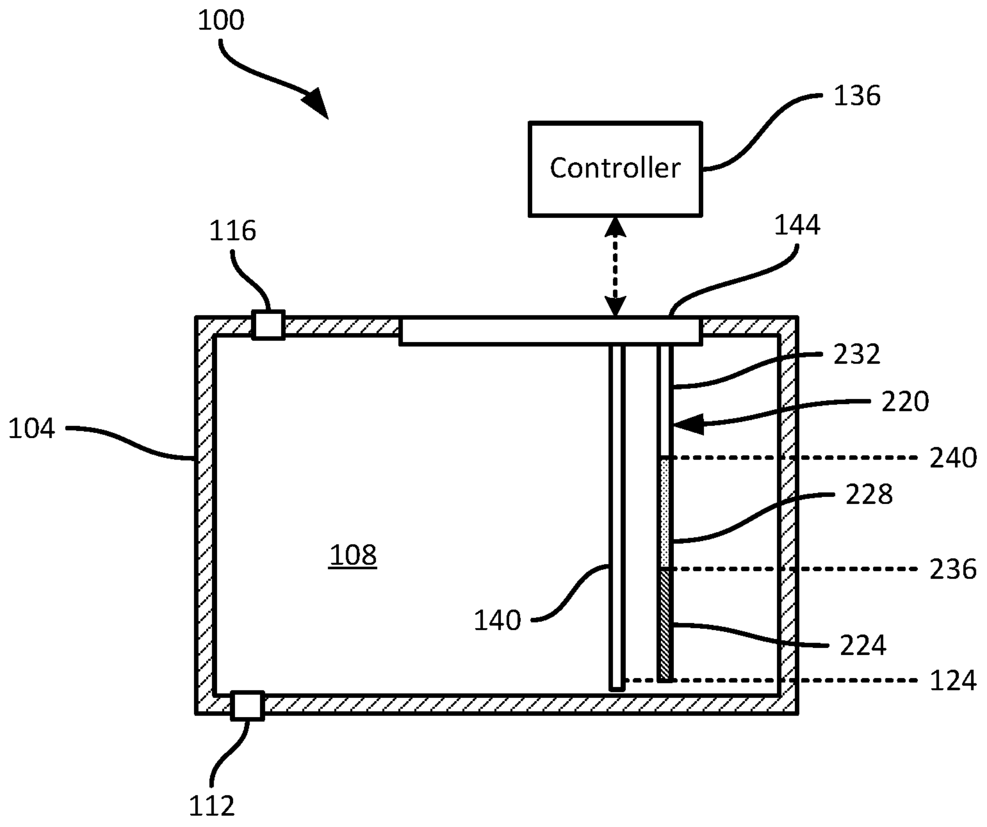
FIG. 2 is a diagram of an example fluid dispenser with a level sensing system.

In some examples, the sensor electrode 120 includes at least one additional segment. Referring to FIG. 2, the fluid dispenser 100 is shown with another example sensing system that includes a sensor electrode 220. The sensor electrode 220 includes a first segment 224, a second segment 228, and a third segment 232, each including different materials with distinct conductivities. The first segment 224 can have a lower conductivity than the second segment 228, and the second segment 228 can have a lower conductivity than the third segment 232. The sensor electrode 220 enables the controller 136 to determine whether a level of the fluid in the reservoir 108 is below the level 124, between the level 124 and a level 236, between the level 236 and a level 240, or above the level 240.

In other examples, sensor electrodes with greater numbers of segments may be implemented. While the segments 128 and 132 illustrated in FIG. 1 have equal lengths, and the segments 224, 228 and 232 illustrated in FIG. 2 have equal lengths, in other examples, the lengths of the segments of the sensor electrode can have different lengths.

Figure 3:
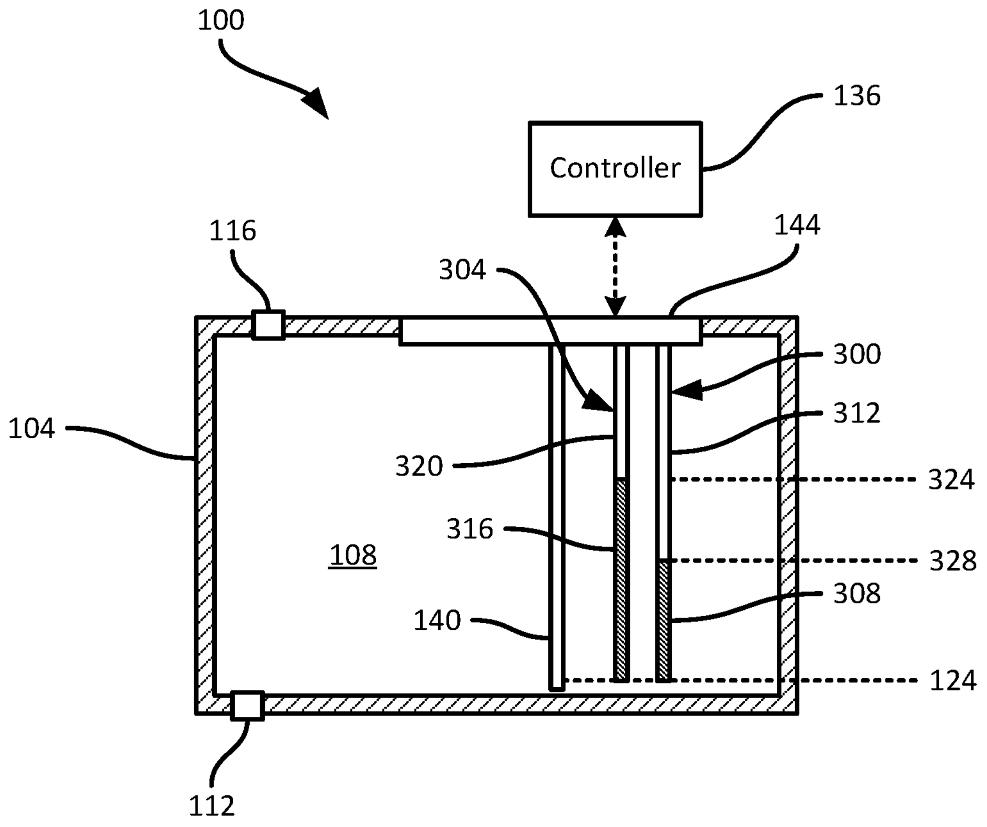
FIG. 3 is a diagram of an example fluid dispenser with a level sensing system.

Turning to FIG. 3, the fluid dispenser 100 is shown with another example sensing system that includes two sensor electrodes 300 and 304. The sensor electrode 300 includes a first segment 308 and a second segment 312, with the first segment 308 having a lower conductivity than the second segment 312. The sensor electrode 304 includes a third segment 316 and a fourth segment 320, with the third segment 316 have a lower conductivity than the fourth segment 320. As seen in FIG. 3, the first segment 308 and the third segment 316 include the same materials and thus have the same conductivities, while the second segment 312 and the fourth segment 320 also include the same materials and thus have the same conductivities. In other examples each of the four segments may employ different materials and therefore have different conductivities.

The boundary between the third and fourth segments 316 and 320, which defines a level 324, is offset from a boundary between the first and second segments 308 and 312, which defines a level 328. The controller 136 is connected to both the sensor electrodes 300 and 304, and therefore detects responses from each sensor electrode. The controller 136, based on the responses, determines which segments of each sensor electrode 300 and 304 are in contact with the fluid in the reservoir 108. Based on such a determination, the controller 136 can determine whether the fluid is below the lever 124, between the level 124 and the level 328, between the level 328 and 324, or above the level 324.

The ability to distinguish between the above-mentioned four regions of fluid level may also be implemented by a single sensor electrode with three segments, such as the sensor electrode 220 shown in FIG. 2. However, in some implementations the use of two distinct sensor electrodes with offset segment boundaries may provide more reliable fluid sensing, as the differences in conductivity between two segments may be greater than differences in conductivity between adjacent ones of larger numbers of segments.

Figure 4:
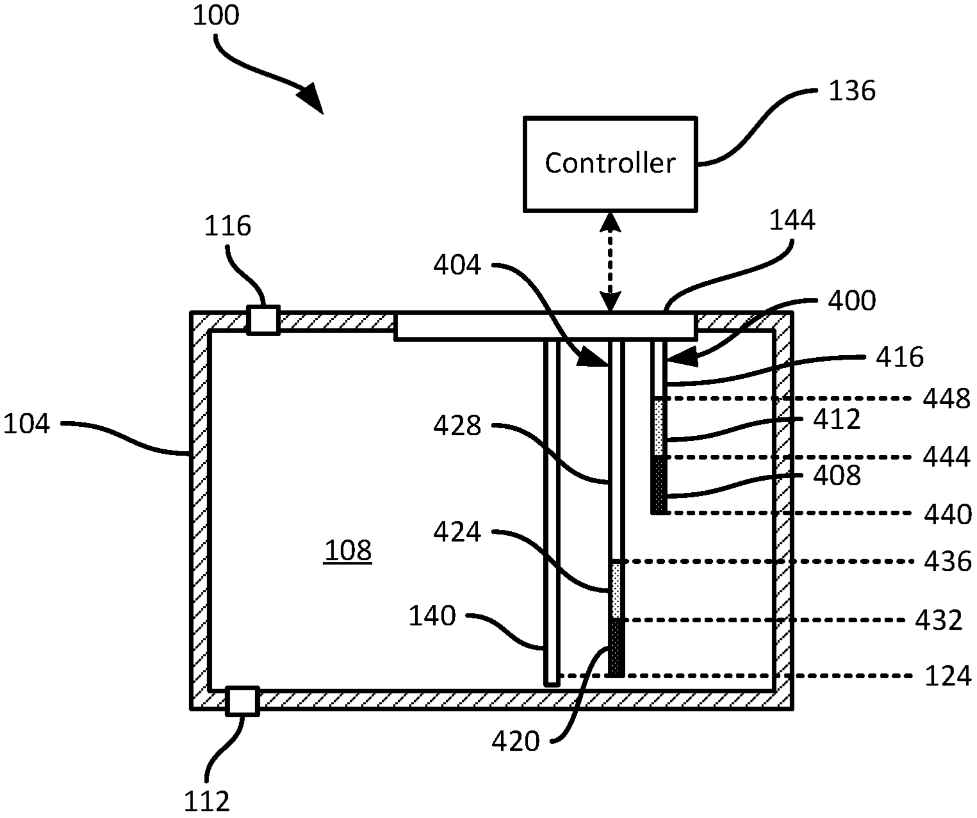
FIG. 4 is a diagram of an example fluid dispenser with a level sensing system.

Turning to FIG. 4, the fluid dispenser 100 is shown with another example sensing system that includes two sensor electrodes 400 and 404. The sensor electrode 400 includes three segments 408, 412 and 416 with increasing conductivities, with the segment 408 having the lowest conductivity. The sensor electrode 404 includes three segments 420, 424 and 428 with increasing conductivities, with the segment 420 having the lowest conductivity. The segments of the sensor electrode 404 define levels 124, 432 and 436 detectable in a lower portion of the reservoir 108, while the segments of the sensor electrode 400 define levels 440, 444 and 448 in an upper portion of the reservoir 108. In addition, the segments 408 and 412, as well as the segments 420 and 424, are identically sized and use the same materials. Therefore, manufacturing of the sensing system may be streamlined by producing multiple pairs of such segments, which may then be attached to the segments 428 and 416 that are manufactured with variable lengths.

Figure 5A:
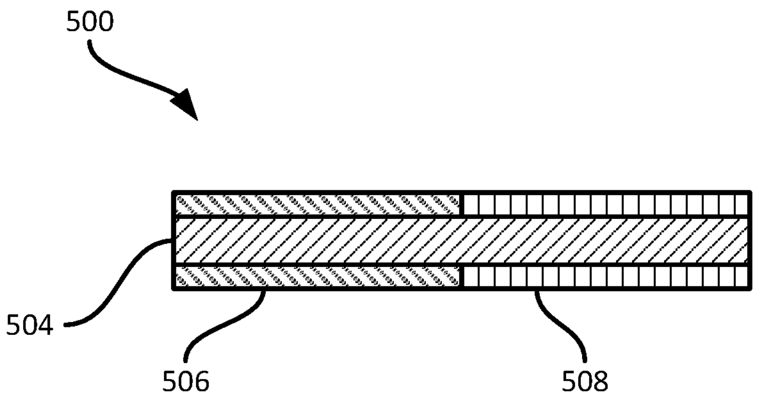
FIG. 5A is a cross section of an example sensor electrode.

The segments of the sensor electrodes discussed above may have various internal structures. In some examples, turning to FIG. 5A, a cross section of a sensor electrode 500 is shown. The sensor electrode 500 includes a conductive core 504 of a conductive core material. Surrounding the conductive core are a first sleeve 506 of a first material, and a second sleeve 508 of a second material. The sleeves 506 and 508 form respective segments of the sensor electrode 500.

Figure 5B:
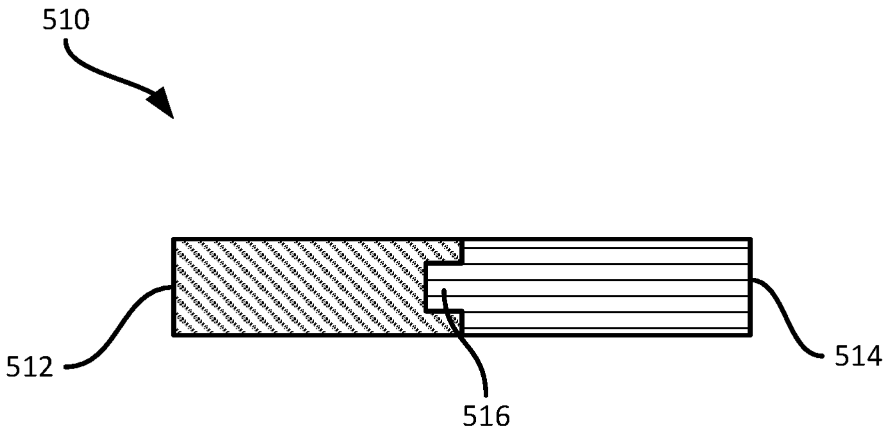
FIG. 5B is a cross section of an example sensor electrode.

Referring to FIG. 5B, a cross section of another sensor electrode 510 is shown. The sensor electrode 510 includes a first segment 512 of a first material, and a second segment 514 of a second material. Rather than being implemented as sleeves about a conductive core, the segments 512 and 514 are joined by way of a protrusion 516 of the second segment 514 that extends from an end of the second segment 514 into a complementary opening at an end of the first segment 512.

Figure 6:
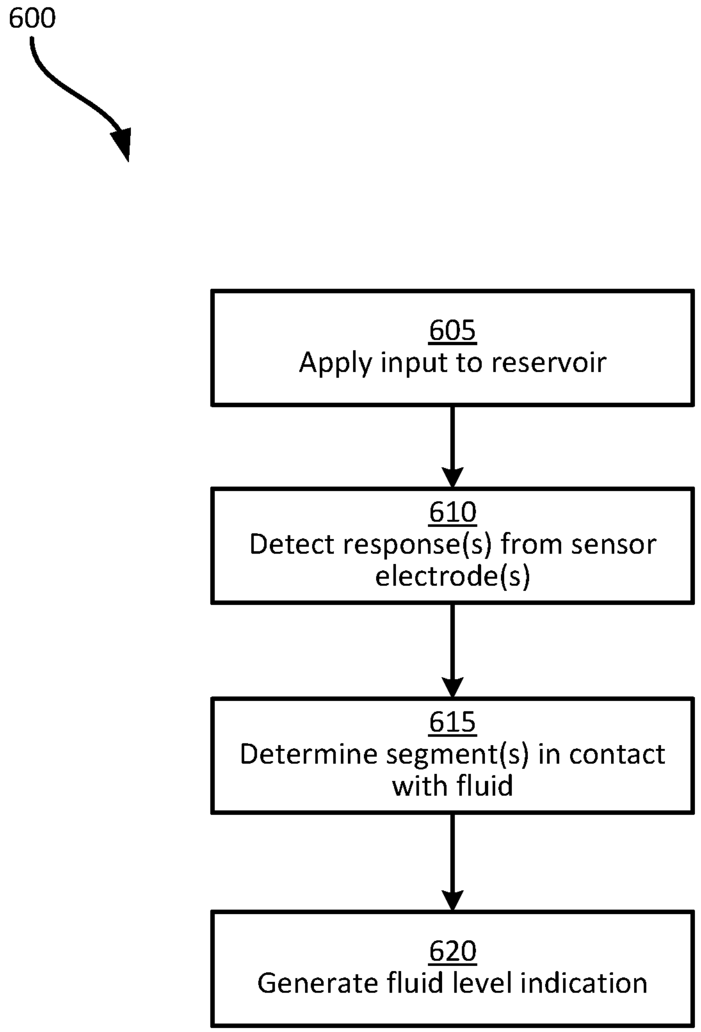
FIG. 6 is an example method of fluid level sensing.

Turning to FIG. 6, and as will also be apparent from the discussion above, the controller 136 can implement a method for monitoring fluid levels via the sensing systems of FIGS. 1-5.

FIG. 6 illustrates a flowchart of a method 600. The method 600 can be performed, for example, by the controller 136. At block 605, the controller 136 applies a drive signal to the reservoir via the drive pin 140. At block 610, the controller 136 detects a response from each sensor electrode of the sensing system. At block 615, based on the response(s) detected at block 610, the controller 136 determines which segments of each sensor electrode are in contact with fluid in the fluid reservoir. At block 620, the controller 136 generates a fluid level indication for transmission, display or the like. The fluid level indication can be, for example, expressed as a fraction corresponding to the nearest level in the reservoir indicated by the response(s) of the sensor electrode(s).

For example, with reference to the sensing system as shown in FIG. 2, the fluid level indication can be selected from values of 0% (empty) when none of the segments of the sensor electrode 220 are in contact with the fluid, 33% when the segment 224 is in contact with the fluid, 66% when the segments 224 and 228 are in contact with the fluid, and 100% when all three segments 224, 228 and 232 are in contact with the fluid.

Figure 7:
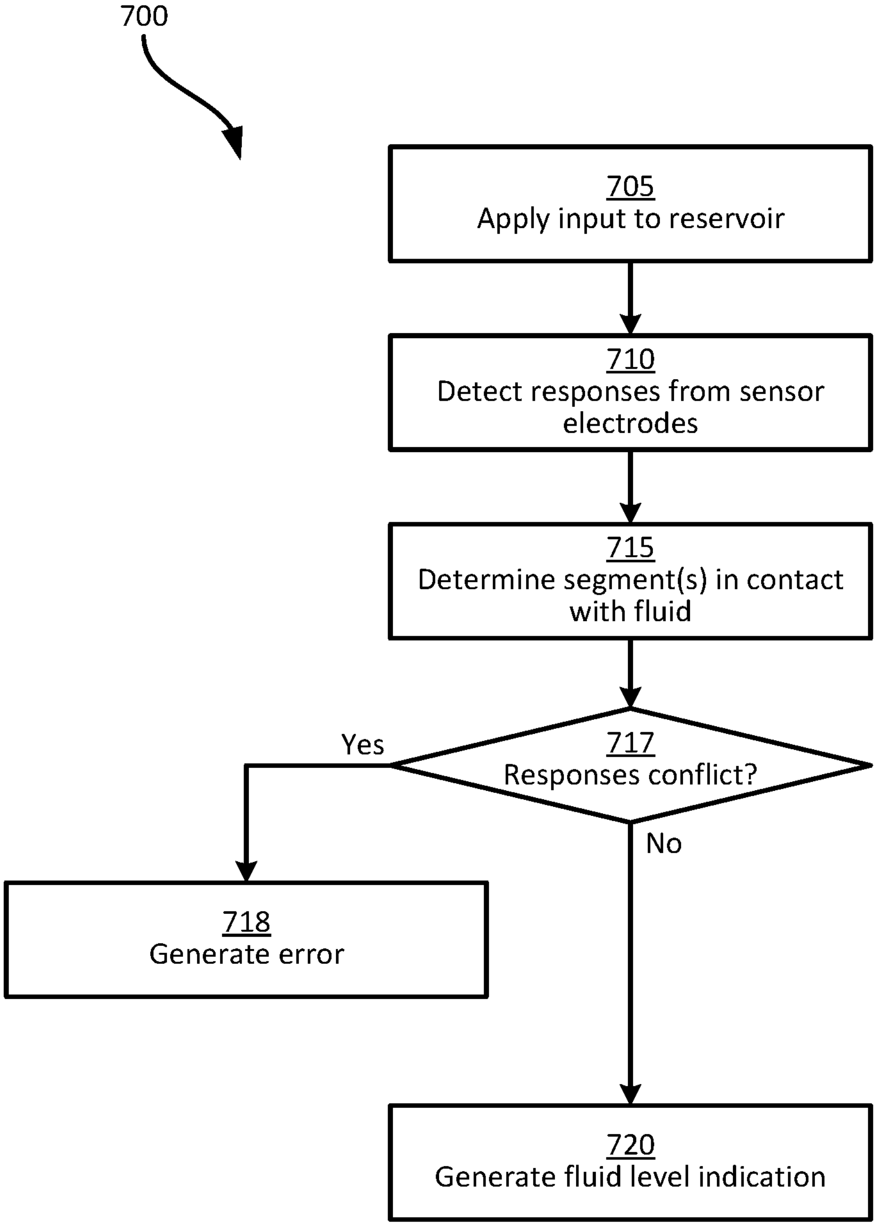
FIG. 7 is an example method of fluid level sensing.

FIG. 7 illustrates a flowchart of another method 700 that may be implemented at the controller 136 when the sensing system of the fluid dispenser 100 includes at least two sensor electrodes. At blocks 705 and 710, the controller 136 applies an input and detects responses from each sensor electrode as described above in connection with blocks 605 and 610. At block 715, the controller 136 determines, based on the responses, which segments of each sensor electrode are in contact with the fluid, as at block 615 of the method 600.

At block 717, the controller 136 determines whether the responses detected at block 710 conflict. For example, in the system of FIG. 4, if a response is detected indicating that only the segment 420 of the sensor electrode 404 is in contact with the fluid, and simultaneously a further response is detected indicating that the segment 408 of the sensor electrode 400 is in contact with the fluid, the determination at block 717 is affirmative. The response noted above conflict because they indicate two distinct fluid levels within the reservoir 108, which may indicate a malfunction of a sensor electrode, the controller 136 or the like.

In response to an affirmative determination at block 717, the controller 136 generates an error message, for display and/or transmission to another controller, at block 718. When the determination at block 717 is negative, the controller 136 proceeds to block 720 to generate the fluid level indication as noted above in connection with block 620.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A fluid level sensing system, comprising:

a sensor electrode to extend into a fluid reservoir, the sensor electrode including a first segment of a first material having a first conductivity, a second segment of a second material having a second conductivity, and a third segment of a third material having a third conductivity, wherein each segment of the first, second, and third segments define a fluid level within the fluid reservoir, and wherein the second segment is in direct electrical contact with the first and third segment; and a controller connected to the sensor electrode, to:

detect a response from the sensor electrode to an input applied to the fluid reservoir by the controller;

determine, based on the response, which of the first, second, and third segments are in contact with fluid in the fluid reservoir; and generate a fluid level indication corresponding to a nearest fluid level in the fluid reservoir indicated by the response of the sensor electrode.

2. The fluid level sensing system of claim 1, further comprising a drive electrode to extend into the fluid reservoir; wherein the controller is to apply the input to the fluid reservoir via the drive electrode.

3. The fluid level sensing system of claim 1, wherein the sensor electrode includes at least one additional segment of an additional material having an additional conductivity different from the first and second conductivities.

4. The fluid level sensing system of claim 1, further comprising:

a sensor mount to support the sensor electrode on a housing defining the fluid reservoir;

wherein the second segment is proximal to the sensor mount, and the first segment is distal to the sensor mount.

5. The fluid level sensing system of claim 4, wherein the first conductivity is lower than second conductivity.

6. The fluid level sensing system of claim 1, wherein the sensor electrode includes a core of a conductive core material; and wherein the first segment includes a first sleeve of the first material about the core, and the second segment includes a second sleeve of the second material about the core.

7. The fluid level sensing system of claim 1, further comprising an additional sensor electrode having a fourth segment of the first material, and a fifth segment of the second material.

8. The fluid level sensing system of claim 7, wherein a boundary between the fourth and fifth segments is offset from a boundary between the first and second segments.

9. The fluid level sensing system of claim 7, wherein a length of the additional sensor electrode is different from a length of the sensor electrode.

10. The fluid level sensing system of claim 1, wherein the first segment includes a protrusion extending from an end of the first segment and the second segment includes an opening at an end of the second segment to receive the protrusion for joining the first segment and the second segment.

11. A fluid dispenser, comprising:

a reservoir for holding a fluid;

a sensor electrode to extend into the reservoir, the sensor electrode including:

a first segment of a first material having a first conductivity, a second segment of a second material having a second conductivity;

a third segment of a third material having a third conductivity; and wherein each segment of the first, second, and third segments define a fluid level within the fluid reservoir, and wherein the second segment is in direct electrical contact with the first and third segment;

a controller connected to the sensor electrode, to:

apply an input to the fluid reservoir;

detect a response from the sensor electrode based on the applied input;

determine, based on the response, which of the first, second, and third segments are in contact with the fluid in the fluid reservoir; and generate a fluid level indication corresponding to a nearest fluid level in the fluid reservoir indicated by the response of the sensor electrode.

12. A method, comprising:

applying an input to a fluid reservoir by a controller;

detecting a response to the input from a sensor electrode in the fluid reservoir, the sensor electrode having a first segment with a first conductivity, a second segment with a second conductivity, and a third segment of a third material having a third conductivity, wherein each segment of the first, second, and third segments define a fluid level within the fluid reservoir, and wherein the second segment is in direct electrical contact with the first and third segment;

determining, based on the response, which of the first segment, the second segment, and the third segment are in contact with fluid in the fluid reservoir; and based on which of the first segment and the second segment are in contact with fluid in the fluid reservoir, generating a fluid level indication corresponding to a nearest fluid level in the fluid reservoir indicated by the response of the sensor electrode.

13. The method of claim 12, further comprising:

detecting an additional response to the input from an additional sensor electrode in the fluid reservoir, the additional sensor electrode having a fourth segment and a fifth segment;

determining, based on the additional response, which of the fourth segment and the fifth segment are in contact with the fluid; and determining whether the response and the additional response conflict.

14. The method of claim 13, further comprising: generating an error message when the response and the additional response conflict.

* * * * *